Jan. 15, 1935.  W. S. BINGHAM  1,988,108
WELD BAR
Filed Aug. 8, 1932    2 Sheets-Sheet 2
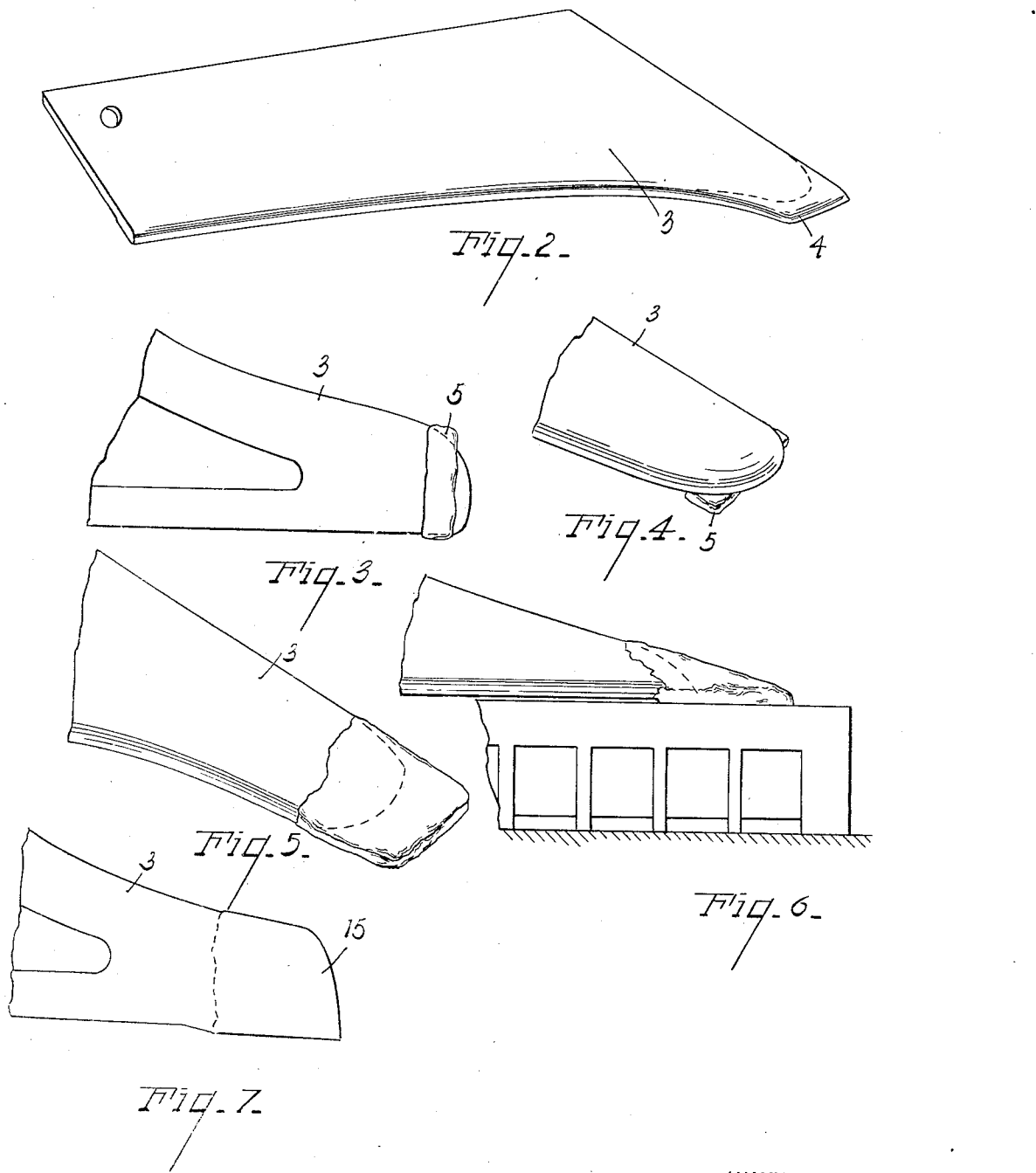

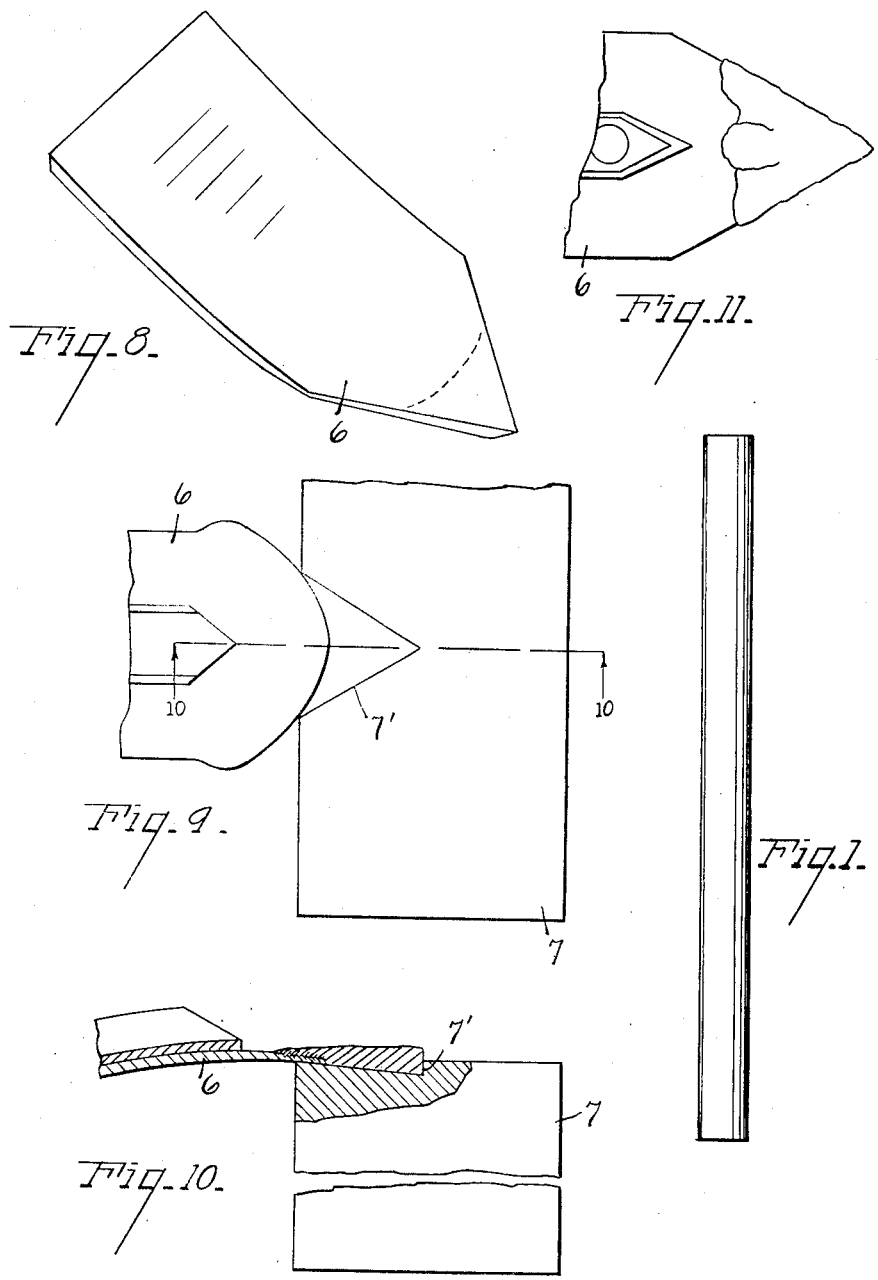

Patented Jan. 15, 1935

1,988,108

UNITED STATES PATENT OFFICE 1,988,108

WELD BAR

Walter S. Bingham, Cassopolis, Mich.

Application August 8, 1932, Serial No. 627,852

5 Claims. (Cl. 219—8)

This invention relates to an improved alloy for weld bar for building up metal points and surfaces the weld bar or rod being well adapted for acetylene or electric arc welding as well.

The objects of this invention are:

First, to provide an improved alloy bar or rod adapted for use with an acetylene welding outfit for building up and forming points such as plow points, digger points, and similar structures and wear resisting surfaces.

Second, to provide an improved welding rod adapted to produce a plow point tip of such alloy metal.

Objects pertaining to details will appear from the description to follow. Structures embodying applications of my invention are illustrated in the accompanying drawings, in which:

Fig. 1 is a view of a bar of my improved alloy metal.

Fig. 2 is a view, as an example of use of my weld bar, of a plow point, the tip of which has been formed of my improved alloy metal.

Fig. 3 is an under side plan view of an old plow point, seen in Fig. 2, showing the first step of application of my improved alloy to such a point.

Fig. 4 is a perspective top view of the point illustrated in Fig. 3.

Fig. 5 is a detail perspective view similar to Fig. 4 after the point has been built up with my improved alloy, the end of the old worn point being indicated by dotted lines.

Fig. 6 is a side elevation view of the structure as seen in Fig. 5 as it appears on the face plate during the operation of building up the same, showing the body of the point slightly raised above the surface to give the correct contour to the point to insure its action by suction to keep it in place.

Fig. 7 is a bottom plan view of the point with the tip finished, showing the point filled in and the surfaces ground off to form.

Fig. 8 is a detail showing an application of my invention as applied to the shovel of a cultivator.

Fig. 9 is a plan view showing the point of a worn cultivator tooth in place on a specially formed die block having a V-shaped depression to receive the tip of the tooth to facilitate building up the point by the use of an acetylene welder and my improved welding rod.

Fig. 10 is a detail sectional elevation on line 10—10 of Fig. 9 showing details of the construction and the over-lapping of the built up alloy metal on the worn tip.

Fig. 11 is a rear view of the tooth with a built up alloy tip thereon showing the overlapping contour and the preferred central strengthening rib therefor fused into the tooth.

In carrying out my invention I prepare an alloy by using half and half of pig iron and scrap steel, such as railroad rails. This is melted together in a foundry cupola at a temperature of about 3200 to 3800 Fahrenheit. When the metal is thoroughly fused and ready to pour, one-third of one per cent by weight of powdered metallic manganese, or the equivalent of one-third of one per cent, is delivered with the molten metal into the crucible for pouring. The metal is then poured into molds. I have found it inexpedient to pour the rods in molds having a diameter of less than five-eighths of an inch. Improved methods may result in a smaller size rod, but this size of rod lends itself exceedingly well to the use with the acetylene torch, as it is the purpose to apply the same in very considerable quantity to properly build up the work in hand, so that this comparatively large sized rod is desirable for the work in hand, such as plow points, cultivator shovels, spring tooth harrow teeth, and the like.

The resulting product shows a mass of metal containing .33% manganese, .50% silicon, 4% carbons, .22% phosphorus, and .11% sulphur. The same has the appearance of a white iron casting and appears, when ready for use, as a roughened rod of about five-eighths inch in diameter.

In Fig. 2 I show a plow point 3 with a tip 4 thereon formed of my improved metal, the worn plow point being indicated by dotted lines.

In Fig. 3, on the under side of the front portion of the plow point 3, I show the initial step in the applying of the metal consisting of a cross strip 5, which adds somewhat to the thickness of the plow point at that point.

In Fig. 5 I show a perspective of the point after it is completely filled out and in Fig. 6 I show the point as it is disposed on a face plate during the process of such building up.

In Fig. 7 I show the point built up and ground off at 15 on the under side making a complete finish for the same with the proper curvature for the suction of the point in use.

I have described the application of my invention to a cast metal plow point, but the same is applicable to steel plow points.

In Fig. 8 I show the shovel for a cultivator with a point of my improved metal applied, the division between the worn shovel and the added alloy being indicated by dotted lines.

In Fig. 9 I show the first step of the process of building up a point on a cultivator shovel 6 or on the tip of a tooth of a spring tooth harrow. I use a die block 7 having a V-shaped depression 7' therein of the approximate form of the finished shovel tip or point. The worn tip is placed in the V-shaped die depression 7' and then with an acetylene welder the metal is built up, filling this depression and overlapping the worn tip, being fused and secured thereto.

In all these steps, I use a suitable flux on the tooth or part which I am building up, this being the usual cast iron flux for use with an acetylene welder. When the tooth is built up as indicated in Fig. 10 it has an appearance on its under or back side similar to that seen in Fig. 11. The sides are ground true making the point sharp and it is desirable to build up considerable thickness at the point, a thing which is not ordinarily feasible to accomplish in the original manufacture of such shovels or teeth. In some soils, of course, it is preferred not to have the extra thickness at this point.

My improved alloy is capable of use in building up points and any worn part where such a filling may be desired. The alloy is also useful as welding material and is useful for welding steel to cast iron, it having in its composition both ingredients. It is also useful in building up wear-resisting surfaces wherever needed.

I have indicated its exact composition which I desire to claim specifically, but I am aware that there is considerable latitude permissible, that the bar would be less effective with a smaller amount of manganese and would, of course, work very well if a larger amount of manganese were used. The precise proportion I indicate is sufficient for most purposes. The phosphorus, sulphur and silicon may properly be regarded as impurities. The carbon, of course, is necessary to secure the proper fusibility and temper.

The phosphorus should be minimized. While there is but .22 percent present no great harm would be done if the amount did not exceed one percent. Sulphur appears to be .11 percent. This is near the limit that is permissible. .18 per cent has been used. Silicon is present at .50 per cent. This is near the limit. More is possible with a corresponding increase in sulphur. One per cent is probably the limit. I have used as high as .94 per cent.

Having thus described my invention, what I claim as new and desire to secure by Letters Patent is:

1. A fusing bar or welding rod consisting of an alloy of iron, carbon four per cent, manganese not less than one-third of one per cent, silicon one-half per cent, sulphur one-tenth of one per cent, and phosphorus one-fifth of one per cent.

2. A fusing bar or welding rod consisting of an alloy of iron, carbon four per cent, manganese not less than one-third of one per cent, silicon one-half per cent, sulphur one-tenth of one per cent.

3. A fusing bar or welding rod consisting of an alloy of iron, carbon four per cent, manganese not less than one-third of one per cent, silicon and sulphur in percentages conducive to the formation of a hard non-brittle iron weld deposit, and phosphorus one-fifth of one per cent.

4. A fusing bar or welding rod consisting of an alloy of iron, carbon four per cent, manganese not less than one-third of one per cent, silicon and sulphur in percentages conducive to the formation of a hard non-brittle iron weld deposit.

5. A fusing bar of cast iron containing manganese not less than one-third of one per cent, silicon, sulphur and phosphorus in percentages conducive to the formation of a hard non-brittle iron weld deposit.

WALTER S. BINGHAM.